(12) United States Patent
Simoncini et al.

(10) Patent No.: US 12,482,229 B2
(45) Date of Patent: Nov. 25, 2025

(54) SYSTEMS AND METHODS FOR DETERMINING VIDEO SIMILARITY, RISK SCORES, AND TEXTUAL DESCRIPTIONS

(71) Applicant: Verizon Patent and Licensing Inc., Basking Ridge, NJ (US)

(72) Inventors: Matteo Simoncini, Florence (IT); Stefano Caprasecca, Florence (IT); Leonardo Sarti, Florence (IT)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 478 days.

(21) Appl. No.: 17/933,247

(22) Filed: Sep. 19, 2022

(65) Prior Publication Data
US 2024/0096056 A1    Mar. 21, 2024

(51) Int. Cl.
*G06V 10/764* (2022.01)
*G06V 20/40* (2022.01)
*G06V 20/56* (2022.01)

(52) U.S. Cl.
CPC ............ *G06V 10/764* (2022.01); *G06V 20/41* (2022.01); *G06V 20/56* (2022.01)

(58) Field of Classification Search
None
See application file for complete search history.

(56) References Cited

U.S. PATENT DOCUMENTS

| | | | | |
|---|---|---|---|---|
| 8,805,707 | B2* | 8/2014 | Schumann, Jr. | G06Q 40/08 705/35 |
| 11,983,778 | B2* | 5/2024 | Walsh | G06Q 40/08 |
| 2012/0123806 | A1* | 5/2012 | Schumann, Jr. | G06Q 40/08 705/4 |
| 2014/0350970 | A1* | 11/2014 | Schumann, Jr. | G08G 1/096775 705/4 |
| 2015/0363635 | A1* | 12/2015 | Suri | G11B 27/034 386/241 |
| 2020/0334762 | A1* | 10/2020 | Carver | G07C 5/0825 |
| 2021/0117923 | A1* | 4/2021 | Gray | G06Q 10/06375 |
| 2021/0193187 | A1* | 6/2021 | Phillips | G06V 20/41 |
| 2022/0164026 | A1* | 5/2022 | Sicconi | G06T 7/254 |
| 2023/0154204 | A1* | 5/2023 | Kahn | G06V 20/44 382/104 |
| 2023/0252800 | A1* | 8/2023 | Coimbra De Andrade | G06V 40/10 382/103 |

* cited by examiner

Primary Examiner — Delomia L Gilliard

(57) ABSTRACT

A device may receive video data identifying videos associated with one or more unsafe driving events by a driver of a vehicle, and may process the video data, with a machine learning model, to determine classifications for the videos. The device may assign tags to the videos based on the classifications, and may calculate event severity scores based on the classifications. The device may calculate tag scores based on the tags assigned to the videos, and may calculate time-to-contact scores, box cross scores, day/night scores, weather scores, and road condition scores based on the video data. The device may calculate video risk scores for the videos based on the event severity scores, the tag scores, the time-to-contact scores, the box cross scores, the day/night scores, the weather scores, and the road condition scores, and may provide one or more of the video risk scores for display.

20 Claims, 14 Drawing Sheets

| Scores/Events | Smart Textual Description |
|---|---|
| RS=33.9<br>TNC=0<br>SNC=0.3 (12 not normalized)<br>MoNC = 0.3<br>MaNC = 0.1<br>CNC = 0 | The risk score (33.9%) is good because there are no tailgating events. However, there are 12 stop-sign-violation events. Be careful about those. |
| RS=9.6<br>TNC=0<br>SNC=0.14 (1 not normalized)<br>MoNC = 0.3<br>MaNC = 0.1<br>CNC = 0 | The risk score for Mike (9.6%) is good because there are no major and no tailgating events. However there is 1 stop-sign-violation event. Be careful about those. |
| RS=85.6<br>TNC=0.8<br>SNC=0.1<br>MoNC = 0.4<br>MaNC = 0.57 (4 not normalized)<br>CNC = 0 | The risk score for Jack (85.6%) is worrying because there are 4 major events. Be careful about those. |

FIG. 1K

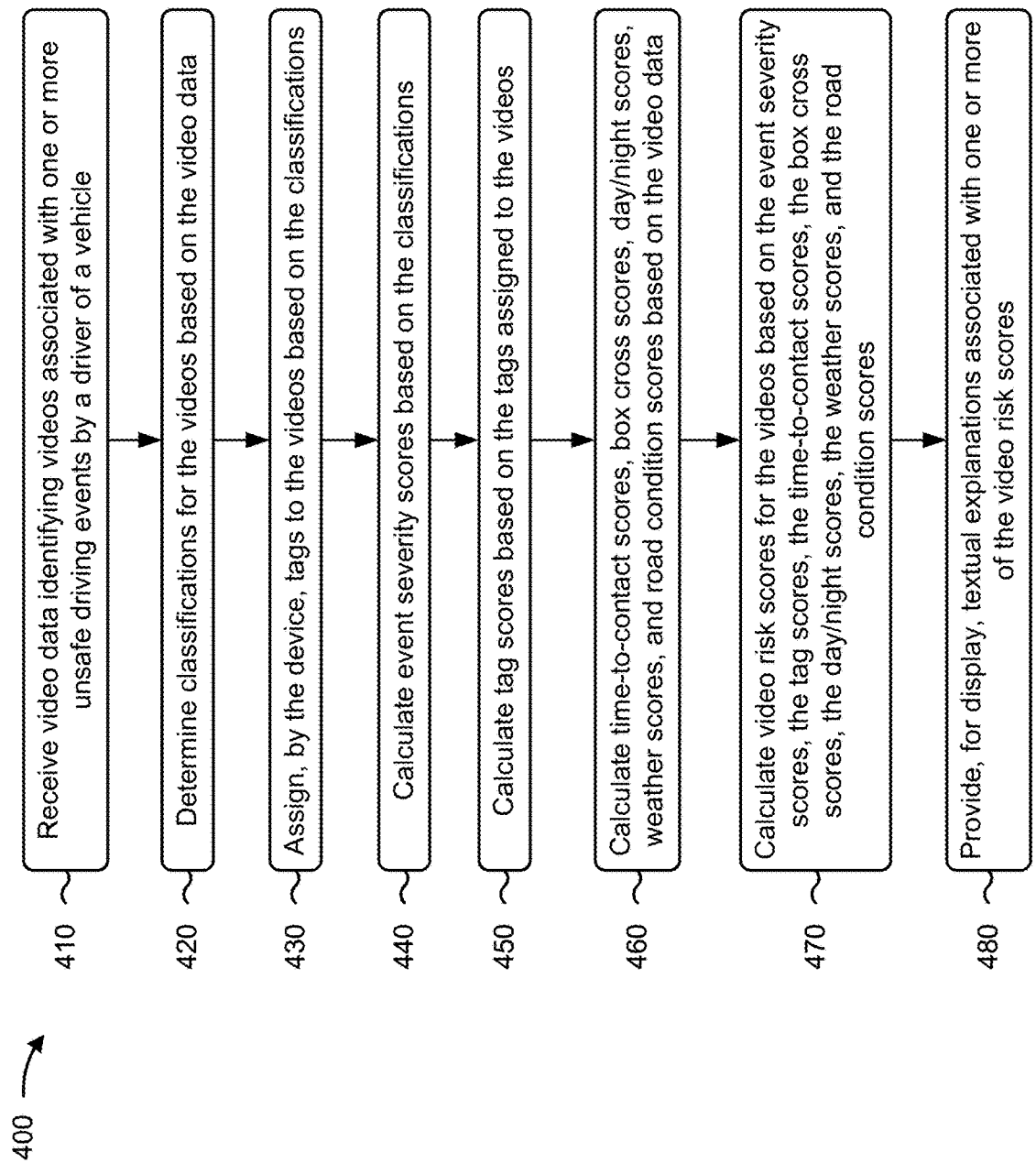

SYSTEMS AND METHODS FOR DETERMINING VIDEO SIMILARITY, RISK SCORES, AND TEXTUAL DESCRIPTIONS

BACKGROUND

Managing drivers of a fleet of vehicles may include rating the drivers based on dashcam video data captured during operation of the vehicles by the drivers.

BRIEF DESCRIPTION OF THE DRAWINGS

FIGS. 1A-1K are diagrams of an example associated with determining video similarity, risk scores, and textual descriptions.

FIG. 4 is a flowchart of an example process for determining video similarity, risk scores, and textual descriptions.

DETAILED DESCRIPTION OF EXAMPLE EMBODIMENTS

Figure 1A:
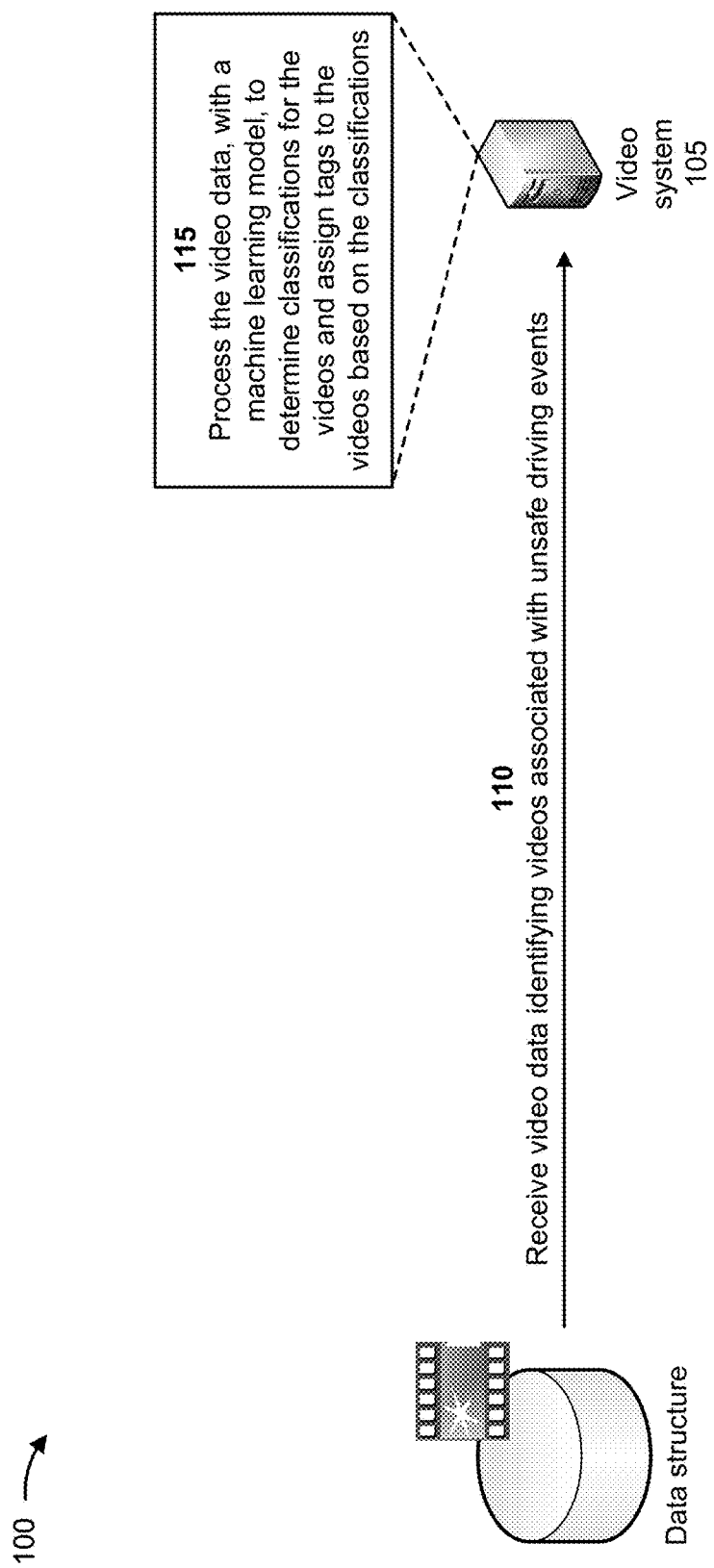

The following detailed description of example implementations refers to the accompanying drawings. The same reference numbers in different drawings may identify the same or similar elements.

Rating drivers in a fleet, for example, may include attempting to calculate risk scores for the drivers based on driving outcomes (e.g., a quantity of crashes, a quantity of fines, and/or the like), and rating the drivers based on the corresponding risk scores calculated for the drivers. However, the risk scores may be difficult to interpret for a fleet manager without underlying information about the scores and may make rating the drivers very difficult. Rating drivers based on the video data may also include attempting identify similar videos to videos being viewed. For example, if a video shows a driver driving a vehicle through a stop sign, a manager analyzing the video may note this poor driving and may attempt to identify other videos of the driver driving the vehicle through stop signs. This may enable the manager to show the driver all the instances of the driver driving the vehicle through stop signs. However, the fleet manager may have to undertake the time consuming task of watching every video captured for the driver.

Thus, current techniques for rating drivers consume computing resources (e.g., processing resources, memory resources, communication resources, and/or the like), networking resources, and/or other resources associated with attempting and failing to correctly interpret risk scores associated with drivers, attempting and failing to identify similar videos to videos being viewed, erroneously rating the drivers based on failing to correctly interpret the risk scores associated with the drivers, and/or the like.

Some implementations described herein provide a video system that determines video similarity, risk scores, and textual descriptions. For example, the video system may receive video data identifying videos associated with one or more unsafe driving events by a driver of a vehicle, and may process the video data, with a machine learning model, to determine classifications for the videos. The video system may assign tags to the videos based on the classifications, and may calculate event severity scores based on the classifications. The video system may calculate tag scores based on the tags assigned to the videos, and may calculate time-to-contact scores, box cross scores, day/night scores, weather scores, and road condition scores based on the video data. The video system may calculate video risk scores for the videos based on the event severity scores, the tag scores, the time-to-contact scores, the box cross scores, the day/night scores, the weather scores, and the road condition scores, and may provide one or more of the video risk scores for display.

In this way, the video system determines video similarity, risk scores, and textual descriptions. For example, the video system may associate risk scores to videos of driving footage based on classifications of the videos. The video system may calculate video similarity scores for the videos, which can be used to automatically provide a list of videos similar to a currently viewed video. The video system may aggregate scores of each video of a single driver to produce a driver risk score for the driver, and may generate a risk score that is easily explainable and interpretable. The video system may automatically generate a textual explanation of a risk score that is more understandable by an operator of the video system than simply a number. Thus, the video system may conserve computing resources, networking resources, and/or other resources that would have otherwise been consumed by attempting and failing to correctly interpret risk scores associated with drivers, attempting and failing to identify similar videos to videos being viewed, erroneously rating the drivers based on failing to correctly interpret the risk scores associated with the drivers, and/or the like. Furthermore, the video system may increase trust of fleet managers and drivers in the video system. For example, instead of just displaying a driving score, the video system may explain the driving score so that the driver may be more engaged with the video system and may attempt to improve driving behavior.

FIGS. 1A-1K are diagrams of an example 100 associated with determining video similarity, risk scores, and textual descriptions. As shown in FIGS. 1A-1K, example 100 includes a video system 105 associated with a data structure. The video system 105 may include a system that determines video similarity, driver risk scores, and textual descriptions for the driver risk scores. The data structure may include a database, a table, a list, and/or the like. Further details of the video system 105 and the data structure are provided elsewhere herein.

As shown in FIG. 1A, and by reference number 110, the video system 105 may receive video data identifying videos associated with unsafe driving events. For example, a dashcam or another video device of a vehicle may record video data (e.g., video footage) of an event associated with the vehicle. The video data may be recorded based on a trigger associated with the event. For example, a harsh event may be triggered by an accelerometer mounted inside the vehicle (e.g., a kinematics trigger). Alternatively, a processing device of the vehicle may include a machine learning model that detects a potential danger for the vehicle and requests further video data based on detecting the potential danger. Alternatively, a driver of the vehicle may cause the video data to be captured at a moment that the event occurs. The vehicle or the video device may transfer the video data to a data structure (e.g., a database, a table, a list, and/or the like). This process may be repeated over time so that the data structure includes video data identifying videos associated with unsafe driving events (e.g., for the vehicle and/or a driver of the vehicle). In some implementations, the video data may be processed by several machine learning models that output severity scores of events (e.g., distinguishing between a critical event, a major event, a moderate event, and a minor event) and a set of additional attributes associated with the events (e.g., a presence or an absence of tailgating, a stop sign violation, a rolling stop at a traffic light, and/or the like). The machine learning models may be associated with severities and the set of additional attributes with the video data in the data structure.

In some implementations, the video system 105 may continuously receive the video data identifying videos associated with unsafe driving events from the data structure, may periodically receive the video data identifying videos associated with unsafe driving events from the data structure, may receive the video data identifying videos associated with unsafe driving events from the data structure based on requesting the video data from the data structure.

As further shown in FIG. 1A, and by reference number 115, the video system 105 may process the video data, with a machine learning model, to determine classifications for the videos and may assign tags to the videos based on the classifications. For example, the video system 105 may include machine learning models. Each machine learning model may focus on a particular domain, may classify each of the videos within the particular domain, and may assign a tag to each of the videos based on the classifications. As an example, the machine learning models may assign the following risk-related tags based on an analysis of the video data (e.g., where a "0" indicates an absence of risk, a "1" indicates a mild violation (some risk), and a "2" indicates a severe violation (great risk)): a tailgating severity tag (e.g., 0, 1, or 2), a stop sign violation severity tag (e.g., 0, 1, or 2), a minor severity confidence tag (e.g., from 0 to 1), a moderate severity confidence tag (e.g., from 0 to 1), a major severity confidence tag (e.g., from 0 to 1), a critical severity confidence tag (e.g., from 0 to 1), a presence of a vulnerable road user (VRU) tag (e.g., 0, 1 or 2), and/or the like.

In some implementations, the video system 105 may include other models that assign additional tags to each of the videos. The additional tags may not be related to a safety condition of an event, but may be utilized to determine a risk score and/or a similarity of a video with other videos. For example, the additional tags may include a time of the day tag (e.g., extracted from metadata or related to lightning conditions, such as night, dawn, day, or twilight), a weather condition tag (e.g., sunny, overcast, rainy, foggy, or snowy), a road characteristics tag (e.g., a quantity of lanes in a road, a one-way road versus a two-way road, or a road type), a road conditions tag (e.g., dry, wet, or snowy), a traffic conditions tag (e.g., a vehicle speed or a quantity and a distance of the vehicle from surrounding vehicles), and/or the like.

Figure 1B:
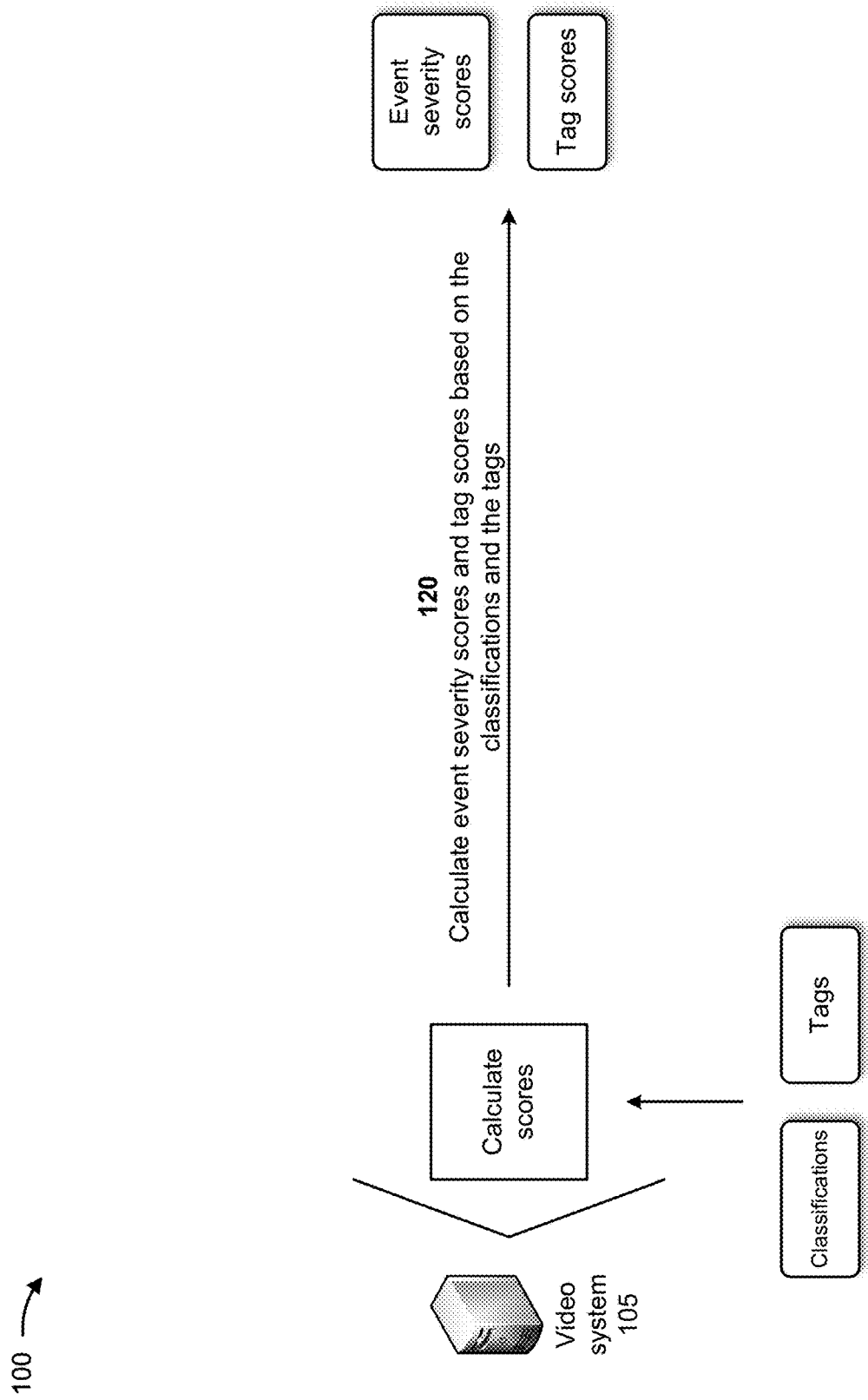

As shown in FIG. 1B, and by reference number 120, the video system 105 may calculate event severity scores and tag scores based on the classifications and the tags. For example, the classifications may include classifications based on event severity probabilities, such as a minor event severity probability (e.g., MinorProba), a moderate event severity probability (e.g., ModerProba), a major event severity probability (e.g., MajorProba), and a critical event severity probability (e.g., CriticalProba). The video system 105 may calculate an event severity score that indicates a severity of an event and distinguishes between minor events, moderate events, major events, and critical events. In one example, the video system 105 may calculate the event severity score (e.g., EvSevScore) as follows:

EvSevScore=MinorProba+10×ModerProba+80×MajorProba+400×CriticalProba.

The video system 105 may calculate a tag score based on the tags assigned to each of the videos, such as the tailgating severity tag (e.g., TailgatingSeverity), the stop sign violation severity tag (e.g., StopSignSeverity), the minor severity confidence tag (e.g., MinorProba), the moderate severity confidence tag (e.g., ModerProba), the major severity confidence tag (e.g., MajorProba), the critical severity confidence tag (e.g., CriticalProba), the presence of a VRU tag (e.g., VRUScore), and/or the like. In one example, the video system 105 may calculate the tag score (e.g., TagsScore) as follows:

TagsScore=15×TailgatingSeverity+50×StopSignSeverity+120×VRUScore.

Figure 1C:
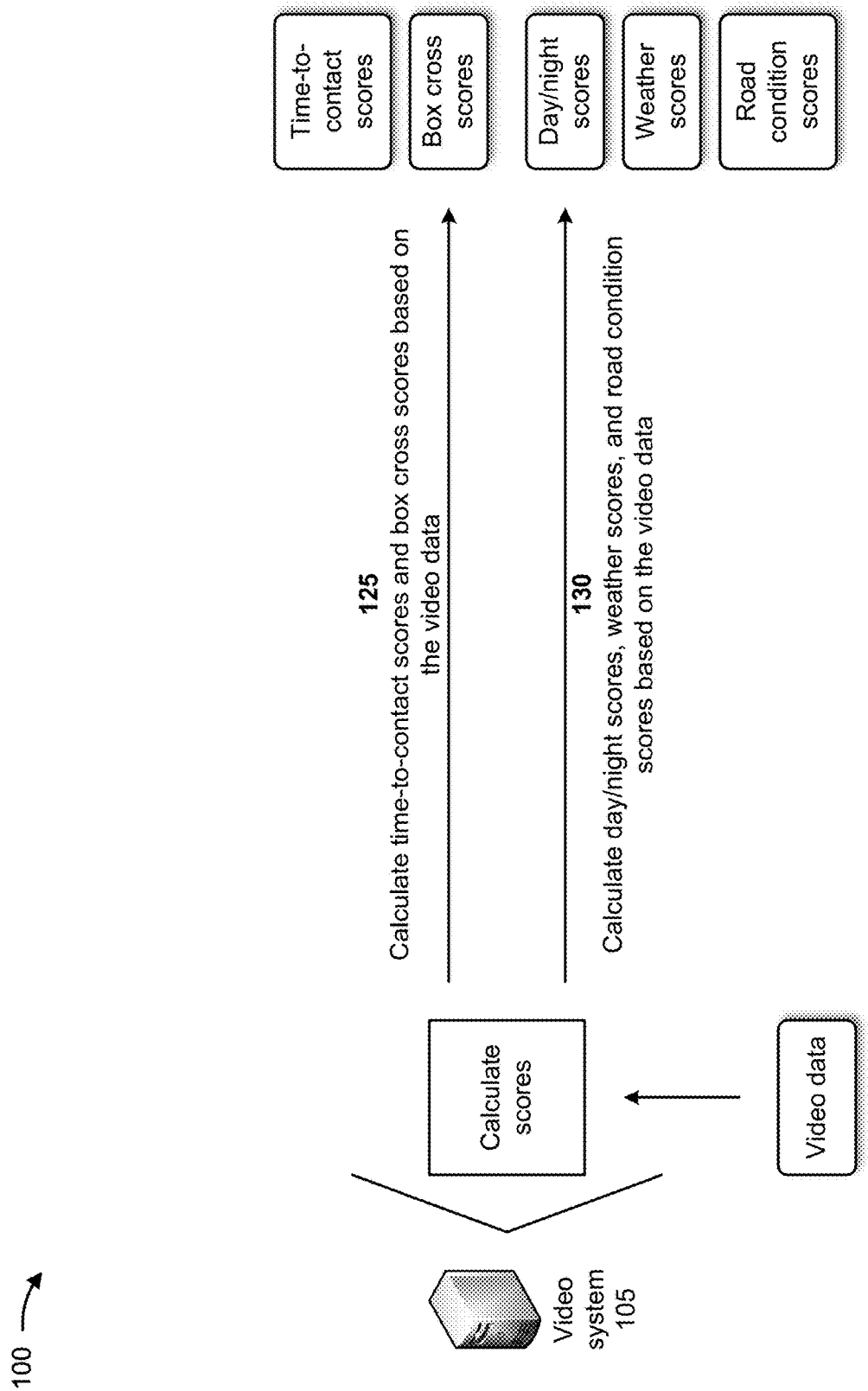

As shown in FIG. 1C, and by reference number 125, the video system 105 may calculate time-to-contact scores and box cross scores based on the video data. For example, for each of the videos, the video system 105 may identify a quantity of boxes (e.g., NumOfVehicles) for each vehicle class (e.g., a car, a bus, a truck, and/or the like) tracked for at least one second (e.g., Tracked Vehicles). Among these vehicles, the video system 105 may calculate an average of the box sizes from a predetermined quantity (e.g., four or less) of the most tracked vehicles (e.g., MostTrackedAvgSize). From the tracked vehicles (e.g., Tracked Vehicles), the video system 105 may calculate an average time-to-contact (e.g., avgTCC) and may calculate the time-to-contact score (e.g., TTCScore) (e.g., the TTC score may be computed from a leading vehicle, identified as a biggest box, and then averaged across all the frames in a video), as follows:

$$TTCScore = e^{avgTTC}$$

The video system 105 may count a quantity of times a box of the tracked vehicles (e.g., Tracked Vehicles) passes from left to right, and vice versa. During a transition of each box, the video system 105 may calculate a distance of the vehicle from another vehicle, and may calculate an average (e.g., avgBoxDistance). If the box remains in the middle, the video system 105 may cease the computation after a predetermined time (e.g., three seconds). The video system 105 may normalize the distance over a predetermined distance (e.g., one-hundred meters). For each box, the video system 105 may calculate a box cross score (e.g., BoxCrossScore) as a sum over each cross of an exponential term that grows higher when the average distance is lower:

$$BoxCrossScore = \Sigma e^{1-avgBoxDistance}.$$

In some implementations, when calculating the time-to-contact scores, the video system 105 may calculate the averages of time-to-contact data provided in the video data, and may calculate exponentials of the averages to generate the time-to-contact scores. In some implementations, when calculating the box cross scores, the video system 105 may calculate averages of box distance data provided in the video data, and may calculate exponentials of the averages to generate the box cross scores.

As further shown in FIG. 1C, and by reference number 130, the video system 105 may calculate day/night scores, weather scores, and road condition scores based on the video data. For example, the video system 105 may extract a predetermined quantity (e.g., five, six, and/or the like) of frames from each of the videos, where the frames equally spaced from each other. The video system 105 may convert the frames into grayscale images so that every pixel in each frame has a value between "0" and "255" (e.g., PixelColors). The video system 105 may calculate a day/night pixel score (e.g., DayNightPixelScore) for each of the videos, as follow:

$$DayNightPixelScore = 1 - \frac{Mean(PixelColors)}{255}.$$

This may enable the video system 105 to apply more weight to a video with darker pixel colors (e.g., at night). The video system may combine a score based on a time of day with the day/night pixel score to calculate the day/night score (e.g., DayNightScore) for the video, as follows:

DayNightScore=DayNightPixelScore+1(when 8:00 PM<time<6:00 AM).

In some implementations, when calculating the day/night scores, the video system 105 may calculate day/night pixel scores based on means of pixel colors provided in the video data, and may calculate the day/night scores based on the day/night pixel scores and times of day provided in the video data.

The video system 105 may utilize the weather condition tag (e.g., sunny, overcast, rainy, foggy, or snowy) and the road conditions tag (e.g., dry, wet, or snowy) assigned to the video data to calculate the weather scores and the road condition scores, respectively. In one example, the video system 105 may calculate a weather score (e.g., WeatherScore), a road condition score (e.g., RoadScore), and a combined weather and road condition score (e.g., WeatherRoadScore), as follows:

WeatherScore=2(if weather=snowy)+1.5(if weather=rainy or foggy)+1(if weather=dry), RoadScore=2(if road=snowy)+1.5(if road=wet)+1(if road=dry), WeatherRoadScore=WeatherScore+RoadScore.

In some implementations, when calculating the weather scores, the video system 105 may assign first weights to first types of weather data provided in the video data to generate first weighted scores, and may assign second weights to second types of weather data provided in the video data to generate second weighted scores. The video system 105 may assign third weights to third types of weather data provided in the video data to generate third weighted scores, and may combine the first weighted scores, the second weighted scores, and the third weighted scores to generate the weather scores.

In some implementations, when calculating the road condition scores, the video system 105 may assign first weights to first road condition data provided in the video data to generate first weighted scores, and may assign second weights to second road condition data provided in the video data to generate second weighted scores. The video system 105 may assign third weights to third road condition data provided in the video data to generate third weighted scores, and may combine the first weighted scores, the second weighted scores, and the third weighted scores to generate the road condition scores.

Figure 1D:
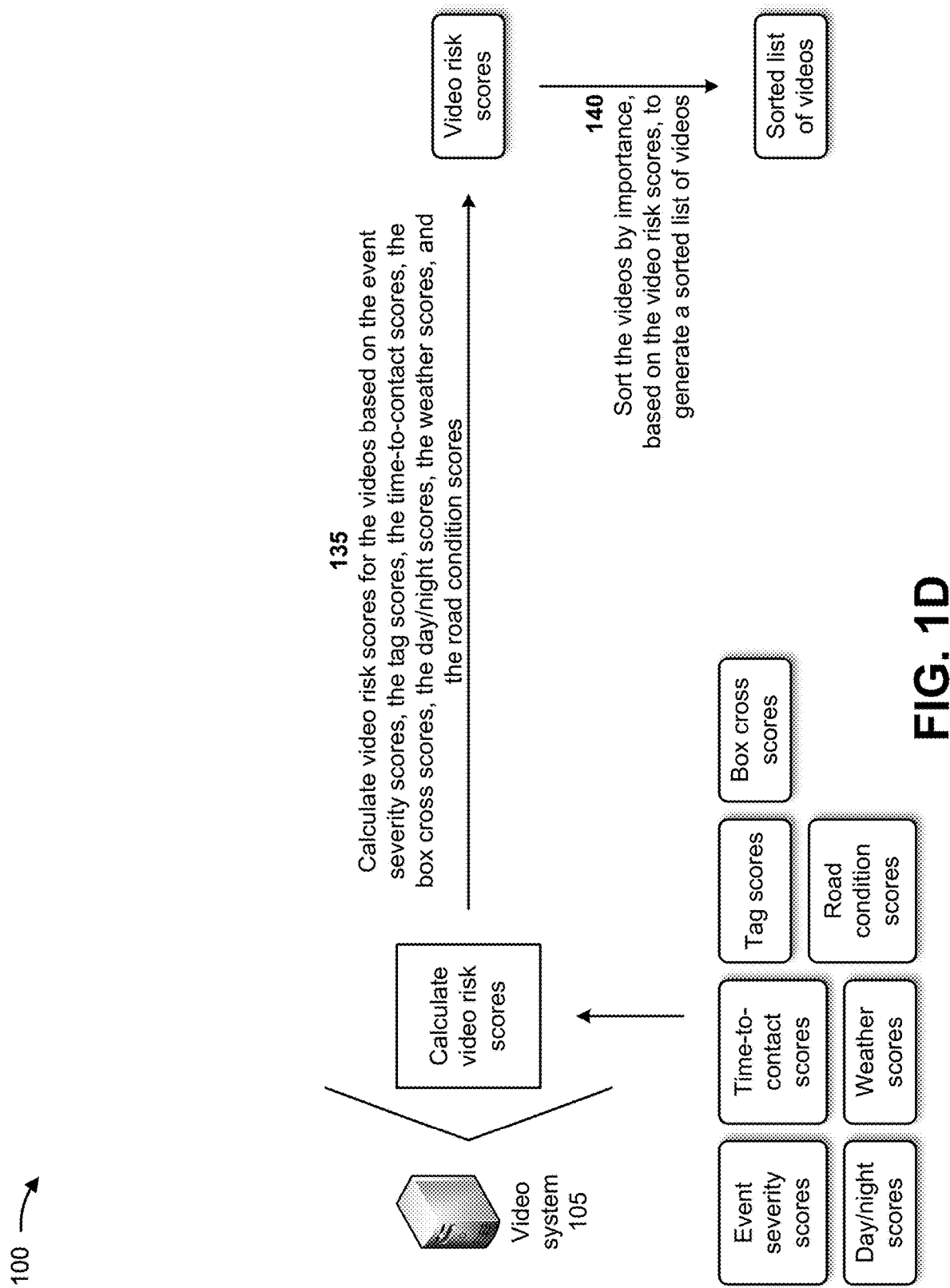

As shown in FIG. 1D, and by reference number 135, the video system 105 may calculate video risk scores for the videos based on the event severity scores, the tag scores, the time-to-contact scores, the box cross scores, the day/night scores, the weather scores, and the road condition scores. For example, the video system 105 may combine the event severity scores, the tag scores, the time-to-contact scores, the box cross scores, the day/night scores, the weather scores, and the road condition scores to calculate the video risk scores for the videos. In some implementations, the video system 105 may calculate a video risk score (e.g., RiskScore), as follows:

RiskScore=WeatherRoadScore×(DayNightScore× TagsScore+TTCScore×BoxCrossScore×Ev- SevScore).

The video system 105 may calculate the video risk score in this manner in order to weight the event severity score for the box crossing score and the TTC score since these scores may have an impact on that aspect of the video (e.g., by increasing or decreasing the video risk score). The tag score is weighted by the day/night score since a violation at night may be more dangerous. Finally, both of these scores are weighted by the combined weather and road score. In some implementations, the video system 105 may store and/or provide for display one or more of the video risk scores.

As shown in FIG. 1D, and by reference number 140, the video system 105 may sort the videos by importance, based on the video risk scores, to generate a sorted list of videos. For example, the video system 105 may rank the videos based on the video risk scores so that a video with a greatest risk score may be ranked first, a video with a next greatest risk score may be ranked second, and so forth. This may generate a ranked list of videos, and the video system 105 may store and/or provide for display the ranked list of videos. In some implementations, the video system 105 may sort the videos based on other criteria to generate the sorted list of videos and may store and/or provided for display the sorted list of videos.

Figure 1E:
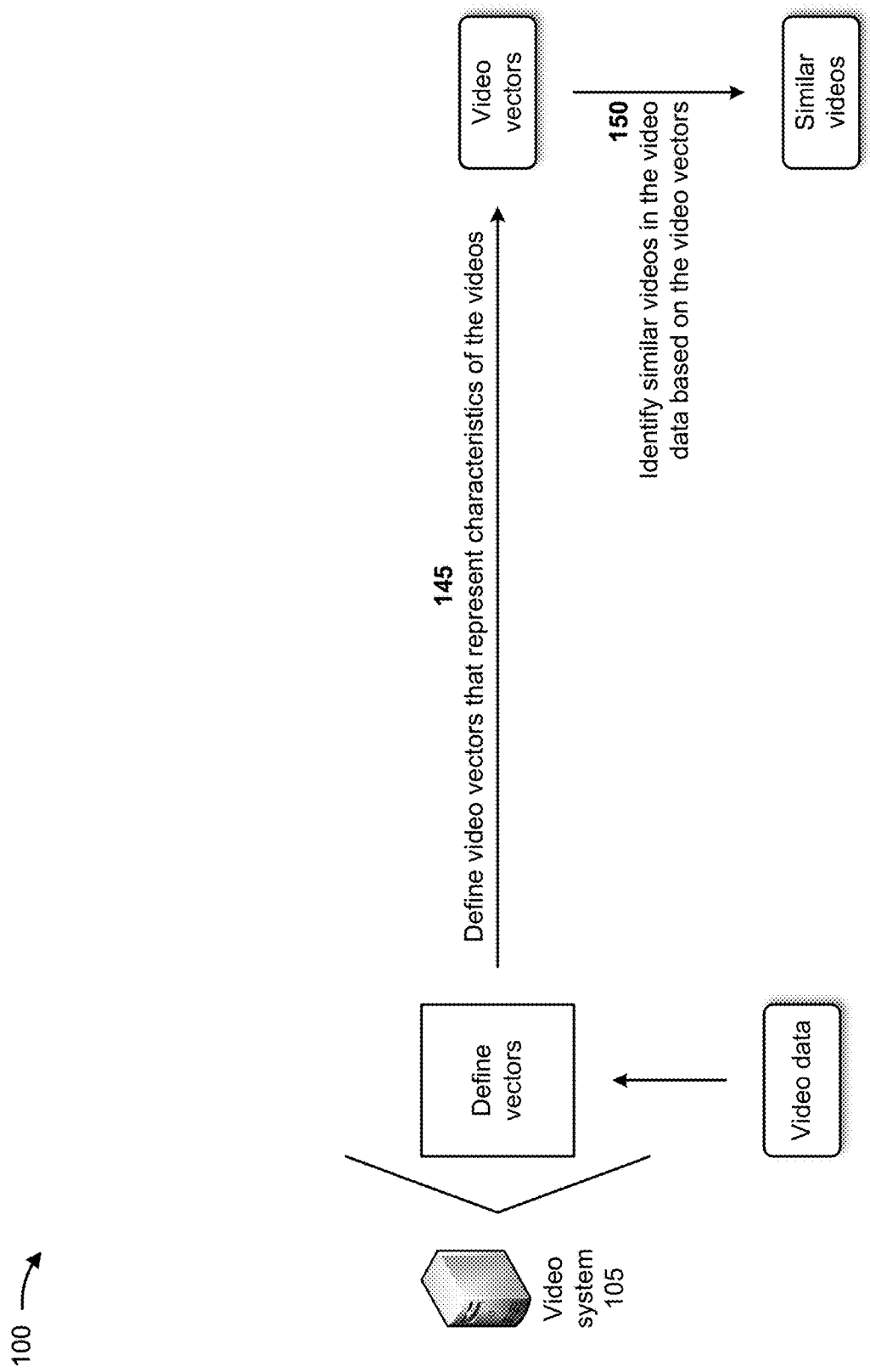

As shown in FIG. 1E, and by reference number 145, the video system 105 may define video vectors that represent characteristics of the videos. For example, for each video, the video system 105 may define a vector that represents the video with all of the characteristics of the video. In some implementations, the vector may include the following fields: a minor event severity probability (e.g., MinorProba) field, a moderate event severity probability (e.g., ModerProba) field, a major event severity probability (e.g., MajorProba) field, a critical event severity probability (e.g., CriticalProba) field, a tailgating severity tag (e.g., TailgatingSeverity) field, a stop sign violation severity tag (e.g., StopSignSeverity) field, a presence of a VRU tag (e.g., VRUScore) field, a quantity of boxes (e.g., NumOfVehicles) field, a most tracked vehicles (e.g., MostTrackedAvgSize) field, a time-to-contact score (e.g., TTCScore) field, a box cross score (e.g., BoxCrossScore) field, a day/night score (e.g., DayNightScore) field, a weather score (e.g., WeatherCore) field, a road condition score (e.g., RoadScore) field, and/or the like.

As further shown in FIG. 1E, and by reference number 150, the video system 105 may identify similar videos in the video data based on the video vectors. For example, to see if two videos are similar (e.g., to calculate a similarity score Similarity), the video system 105 may calculate a dot product of two of the vectors (e.g., vector A and vector B) of the videos and may divide the dot product by a product of $l^2$ norms of the vectors to generate a result, as follows:

$$Similarity = \frac{A \cdot B}{(||(|A|)||(|B|)|}.$$

The result may vary between −1 and +1. A result close to 1 may indicate that the videos are very similar, and a result close to −1 may indicate that the videos are completely opposite. In some implementations, the video system 105 may weight each element of a vector so that a similarity between some of the fields may have a higher impact on the similarity score (e.g., two videos both with stop violations could be more similar than two videos both on a highway). Such weights may be applied after the dot product calculation or be adjusted based on feedback.

In some implementations, the video system 105 may store and/or provide for display similar videos. For example, using the similarity score, the video system 105 may display similar videos to a playing video, from a same driver or from different drivers. The video system 105 may display most relevant videos for a driver during a time period (e.g., in a last week), which may save a lot of time in locating videos for the driver.

Figure 1F:
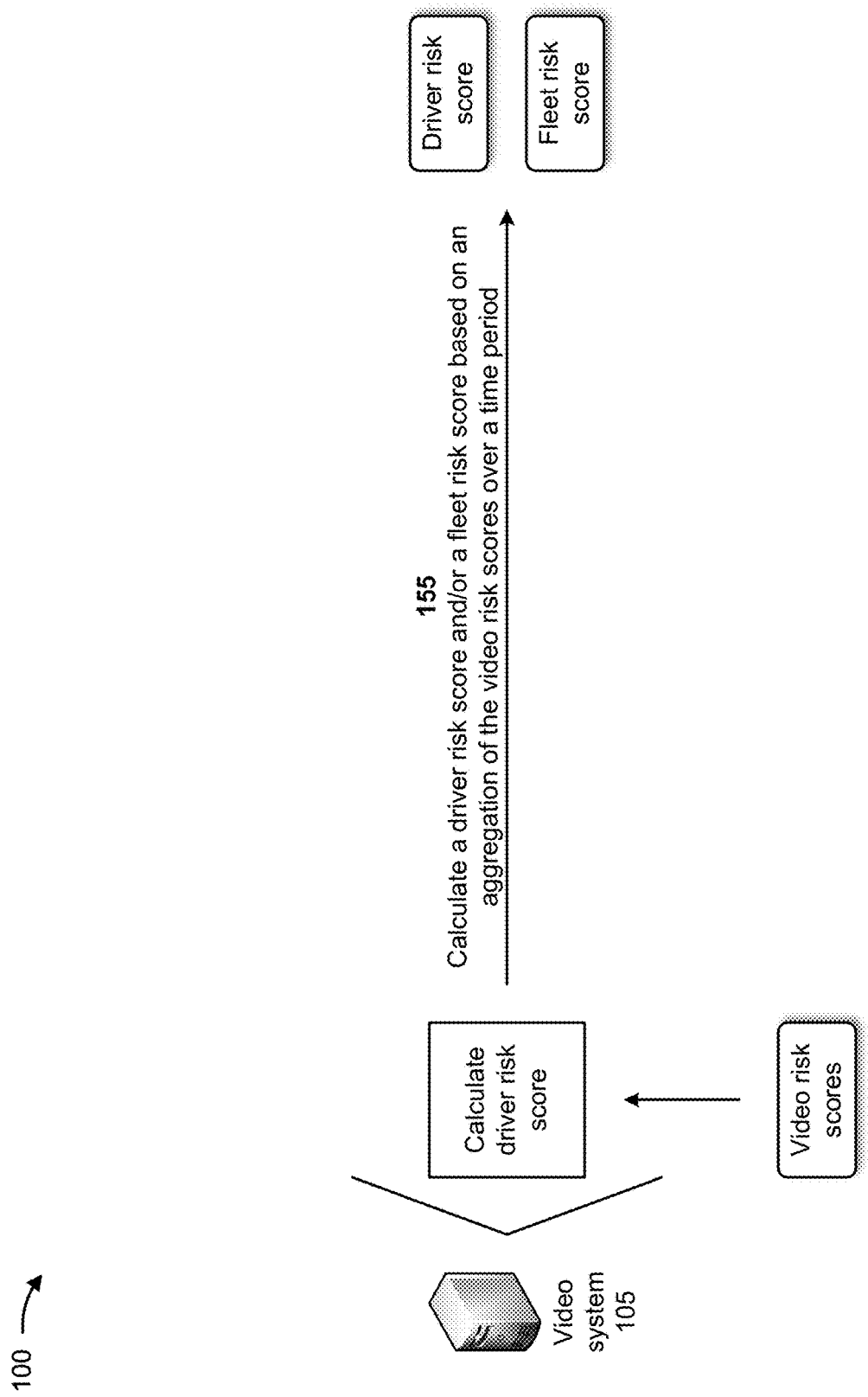

As shown in FIG. 1F, and by reference number 155, the video system 105 may calculate a driver risk score and/or a fleet risk score based on an aggregation of the video risk scores over a time period. For example, the video system 105 may calculate the driver risk score based on an average of the video risk scores over a time period. The video system 105 may store and/or provide for display the driver risk score. In some implementations, the video system 105 may calculate the fleet risk score based on an average of driver risk scores associated with drivers of a fleet of vehicles, over a time period. The video system 105 may store and/or provide for display the fleet risk score.

The fleet risk score may indicate an overall safety level of a fleet using a single number, and, thus, may be utilized for the fleet safety management. A fleet manager may utilize the fleet risk score to compare a current situation with past situations. A positive trend might signify that the fleet drivers are taking increasingly more risks and driving increasingly less safely, thus potentially increasing a risk of being involved in crashes. Being able to realize that this is happening, before a crash actually occurs, the fleet manager can immediately take actions to avoid it. In some implementations, the video system 105 may compare the fleet risk score with fleet risk scores of competitors, so that a fleet manager may become determine whether the fleet is overall more or less safe than the competitors and may take appropriate actions if necessary.

Figure 1G:
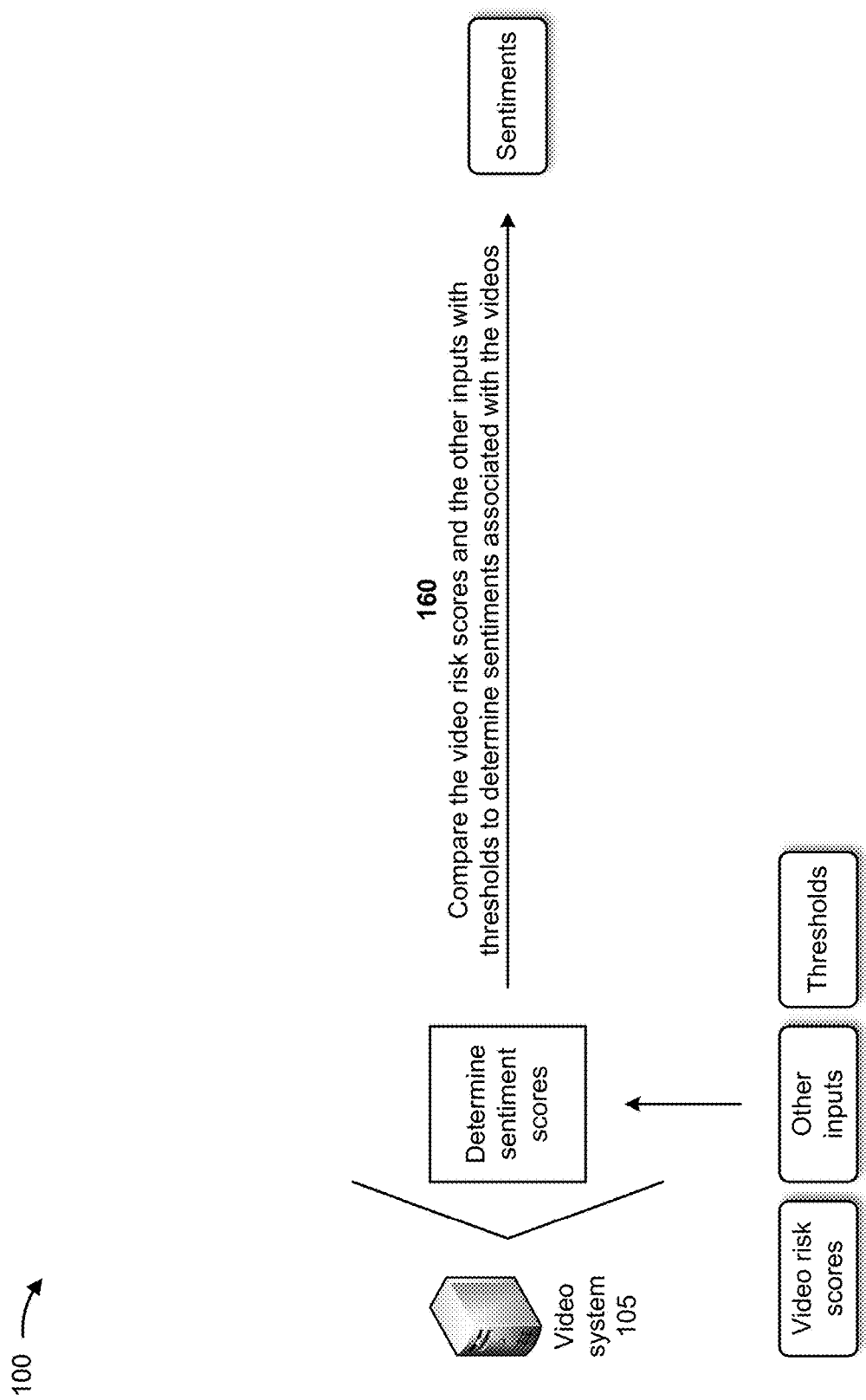

As shown in FIG. 1G, and by reference number 160, the video system 105 may compare the video risk scores and the other inputs with thresholds to determine sentiments associated with the videos. A video risk score may correlate with a likelihood of a single driver or a group of drivers to be involved in a vehicle crash or in a dangerous situation. The video risk score may be a number between a minimum and a maximum value (e.g., between "0" and "100"), where "0 may indicate an extremely safe driver and "100" may indicate an extremely dangerous driver. However, an issue with a video risk score is that the video risk score is just a metric that aggregates different sources of data into a single value. Thus, it may be difficult to understand reasons behind the video risk score.

While the video risk score captures a level of risk associated with a driver or a fleet, the video system 105 may also determine a textual description that translates relevant safety information into natural language, explains reasons behind the video risk score, and suggests areas of improvement. The video system 105 may utilize the video risk scores (e.g., RiskScore) or the driver risk score, a quantity of events classified as having critical severity, a major severity, a moderate severity, or a minor severity, and a quantity of events associated with each attribute (e.g. a quantity of events where a stop sign violation was detected, where tailgating was detected, where traffic light violations were detected, and/or the like) to determine textual descriptions. The video system 105 may normalize the input data with a normalization_factor that considers a quantity of days analyzed and a quantity of drivers (e.g., normalization_factor=num_drivers×num_days). For example, a quantity of tailgating events may be normalized as follows:

$$\text{tailgating\_norm\_count} = \frac{\text{tailgating\_count}}{\text{normalization\_factor}}.$$

The video system 105 may normalize the other input data in a similar manner.

The video system 105 may set thresholds for each of the input data values. The thresholds may represent the upper and lower limits that trigger a textual description. In some implementations, if one of the input data values are greater than upper thresholds or are less than lower thresholds, the textual description may be modified by adding a textual element (e.g., a textual description). The textual description may include a positive sentiment (e.g., if a current situation is to be encouraged) or a negative sentiment (e.g., if the current situation is worrying). The video system 105 may compare the video risk scores and the other inputs with the thresholds to determine sentiments associated with the videos. The next table shows a sentiment associated with the input data values, upper thresholds utilized, and lower thresholds utilized.

| Input data value | The sentiment is negative (the situation is worrying) | The sentiment is positive (The situation is good) |
| --- | --- | --- |
| Risk score (RS) | 45 or more | 39 or less |
| Tailgating normalized count (TNC) | 1 or more | 0.2 or less |
| Stop sign violation normalized count (SNC) | 0.1 or more | 0.02 or less |
| Moderate events normalized count (MoNC) | 0.5 or more | 0.1 or less |
| Major events normalized count (MaNC) | 0.2 or more | 0.02 or less |
| Critical events normalized count (CNC) | More than 0 | 0 |

The video system 105 may utilize this table to determine, for each type of event and/or score, whether the sentiment of a relative textual description is positive or negative, or neutral. For example, the video system 105 may determine the sentiment of a textual description as shown in the following table.

| Metrics | Risk score | Tailgating | Stop sign | Moderate | Major | Critical |
| --- | --- | --- | --- | --- | --- | --- |
| RS = 25<br>TNC = 0.8<br>SNC = 0.11<br>MoNC = 0.01<br>MaNC = 0.01<br>CNC = 0 | Positive | Neutral | Negative | Positive | Positive | Neutral |
| RS = 65<br>TNC = 0.1<br>SNC = 2.1<br>MoNC = 0.3<br>MaNC = 0.3<br>CNC = 1 | Negative | Positive | Negative | Neutral | Negative | Negative |

Depending on a particular combination of input data values, the final textual description may include both positive and negative sentiment components.

Figure 1H:
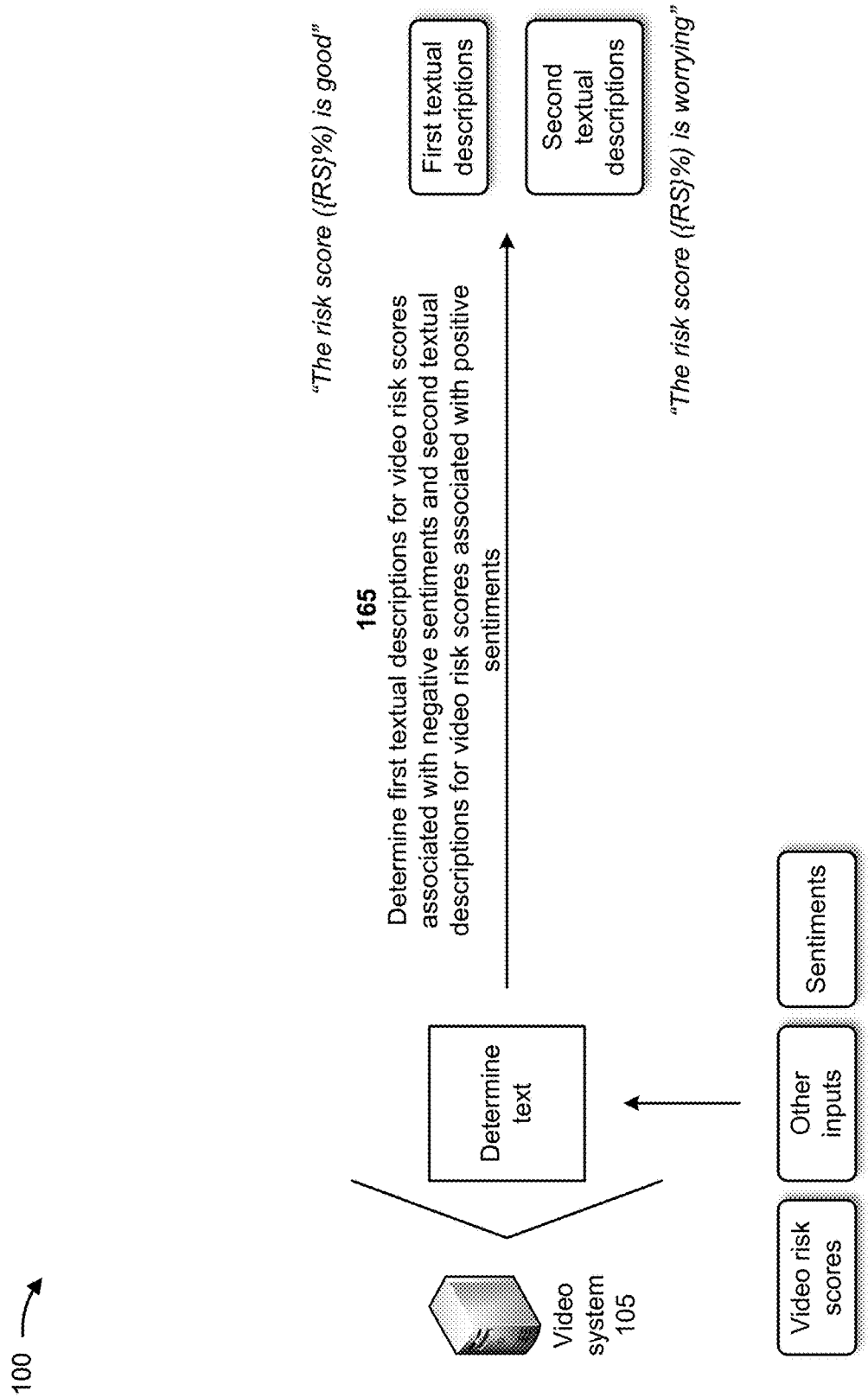

As shown in FIG. 1H, and by reference number 165, the video system 105 may determine first textual descriptions for video risk scores associated with negative sentiments and second textual descriptions for video risk scores associated with positive sentiments. For example, in order to convert the input data into a textual description that suggests which aspects of a fleet or a driver are good and which are worrying instead, the video system 105 determine whether a sentiment of the video risk scores (e.g., or the driver risk score) is positive or negative. If the sentiment of the video risk scores is positive, the video system 105 may include a description (e.g., "The risk score ({RS}%) is good") in the textual description. If the sentiment of the video risk scores is negative, the video system 105 may include a description (e.g., "The risk score ({RS}%) is worrying") in the textual description. If the risk score refers to a particular driver, the video system 105 may include the text (e.g., "for {driver_name}") in the textual description. If the sentiment of the video risk scores is negative, the video system 105 may determine why the sentiment is negative, and which events justify the negative sentiment, to identify where a driver or a fleet should improve and to take appropriate actions. If the sentiment of the video risk scores is positive, the video system 105 may determine what a driver is doing well so that it becomes clear which aspects of the driver's behavior is to be encouraged.

Figure 1I:
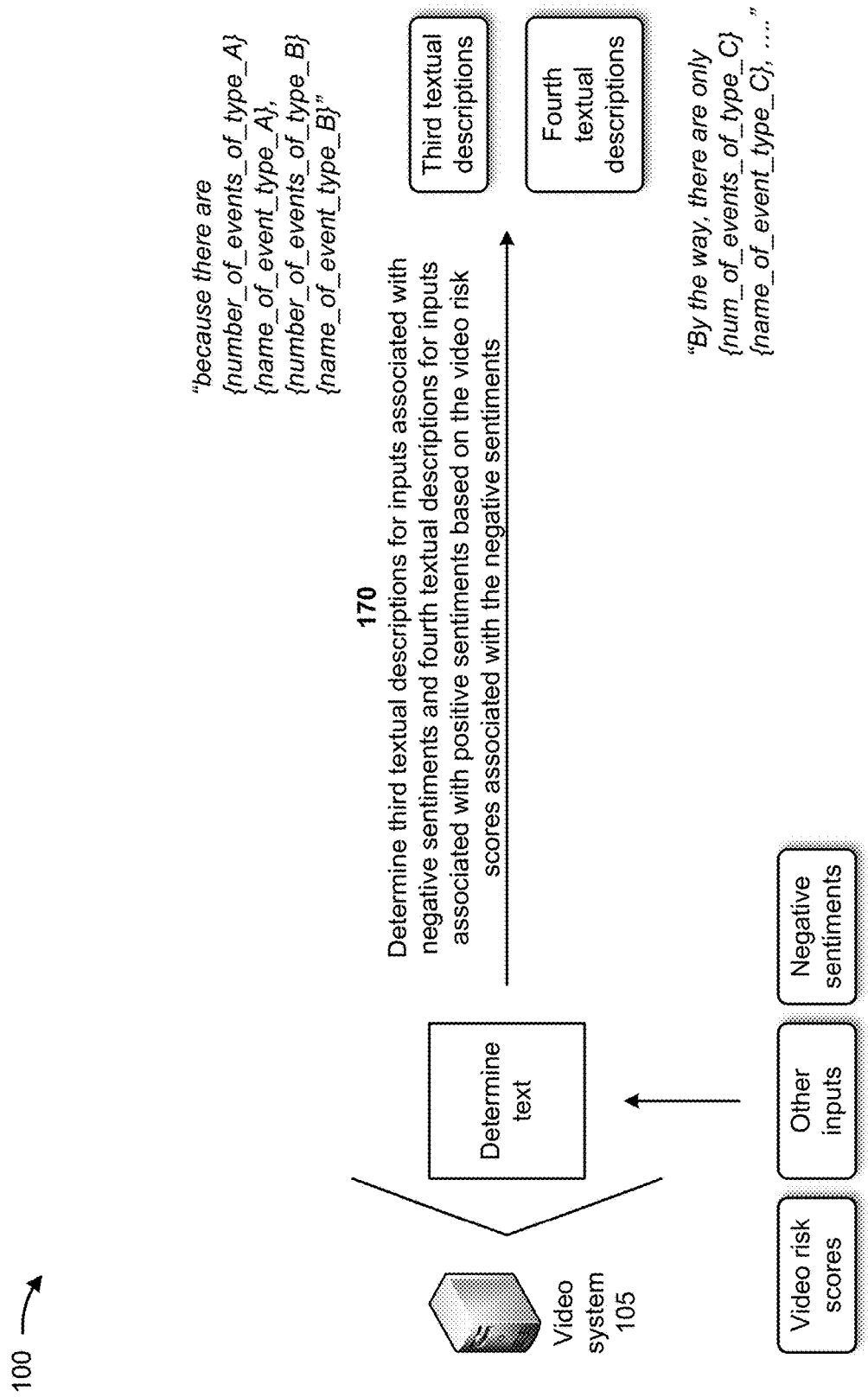

As shown in FIG. 1I, and by reference number 170, the video system 105 may determine third textual descriptions for inputs associated with negative sentiments and fourth textual descriptions for inputs associated with positive sentiments based on the video risk scores associated with the negative sentiments. In some implementations, if the sentiment of the video risk scores is negative, the video system 105 may identify the input data values associated with a negative sentiment. If the video risk scores are the only input data associated with the negative sentiment, the video system 105 may include a description (e.g., "because the number of events are slightly above the industry average") in the textual description. If other input data values are associated with the negative sentiment, for each of the other input data values, the video system may include a description (e.g., "because there are only {number_of_events_of_type_A} {name_of_event_type_A}, {numbers_of_type_B} {name_of_event_type_B}, be careful about those" in the textual description, where events of type A and B are the input associated with a negative sentiment. If there are also input data values associated with a positive sentiment, the video system 105 may include a description (e.g., "By the way, there are only {num_of_events_of_type_C} {name_of_event_type_C}, . . . ") in the textual description, where events of type C are the input associated with the positive sentiment.

Figure 1J:
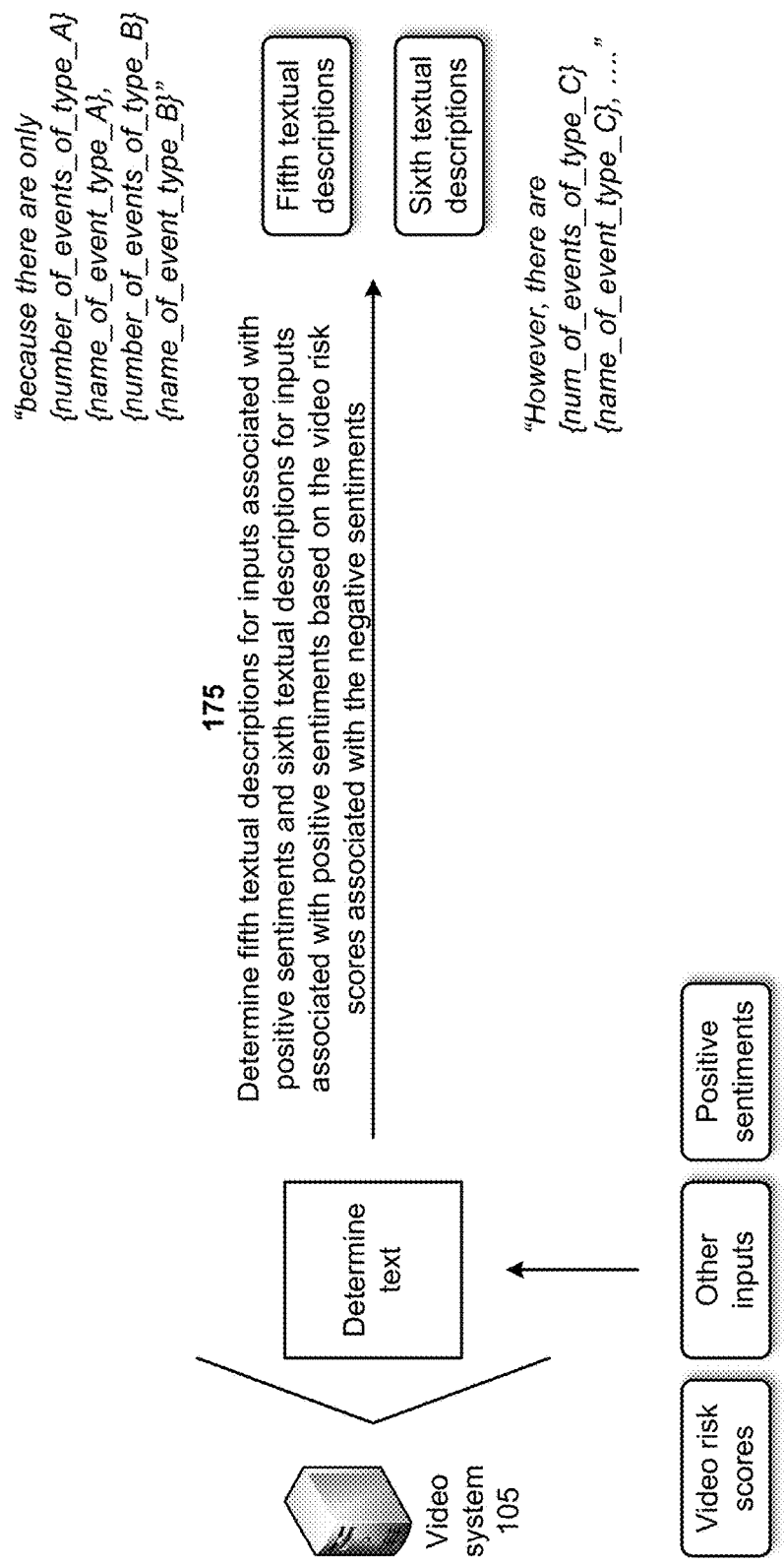

As shown in FIG. 1J, and by reference number 175, the video system 105 may determine fifth textual descriptions for inputs associated with positive sentiments and sixth textual descriptions for inputs associated with negative sentiments based on the video risk scores associated with the positive sentiments. In some implementations, if the sentiment of the video risk scores is positive, the video system 105 may identify the input data values associated with a positive sentiment. If the video risk scores are the only input data associated with the positive sentiment, the video system 105 may include a description (e.g., "because the number of events are slightly below the industry average") in the textual description. If other input data values are associated with the positive sentiment, for each of the other input data values, the video system may include a description (e.g., "because there are only {number_of_events_of_type_A} {name_of_event_type_A}, {number_of_events_of_type_B} {name_of_event_type_B}" in the textual description, where events of type A and B are the input associated with a positive sentiment. If there are also input data values associated with a negative sentiment, the video system 105 may include a description (e.g., "However, there are {num_of_events_of_type_C} {name_of_event_type_C}, . . . ") in the textual description, where events of type C are the input associated with the negative sentiment. In some implementations, the video system 105 may store and/or provide for display one or more of the textual descriptions determined by the video system 105.

FIG. 1K depicts example textual descriptions for the video risk scores and/or events. As shown, for a score/event with RS=33.9, TNC=0, SNC=0.3, MoNC=0.3, MaNC=0.1, and CNC=0, the video system 105 may determine a textual description of "The risk score (33.9%) is good because there are no tailgating events. However, there are 12 stop-sign-violation events. Be careful about those." For the score/event with RS=9.6, TNC=0, SNC=0.14, MoNC=0.3, MaNC=0.1, and CNC=0, the video system 105 may determine a textual description of "The risk score for Mike (9.6%) is good because there are no major and no tailgating events. However, there is 1 stop-sign-violation event. Be careful about those." For the score/event with RS=85.6, TNC=0.8, SNC=0.1, MoNC=0.4, MaNC=0.57, and CNC=0, the video system 105 may determine a textual description of "The risk score for Jack (85.6%) is worrying because there are 4 major events. Be careful about those."

In this way, the video system 105 determines video similarity, risk scores, and textual descriptions. For example, the video system 105 may associate risk scores to videos of driving footage based on classifications of the videos. The video system 105 may calculate video similarity scores for the videos, which can be used to automatically provide a list of videos similar to a currently viewed video. The video system 105 may aggregate scores of each video of a single driver to produce a driver risk score for the driver, and may generate a risk score that is easily explainable and interpretable. The video system 105 may automatically generate a textual explanation of a risk score that is more understandable by an operator of the video system. Thus, the video system 105 may conserve computing resources, networking resources, and/or other resources that would have otherwise been consumed by attempting and failing to correctly interpret risk scores associated with drivers, attempting and failing to identify similar videos to videos being viewed, erroneously rating the drivers based on failing to correctly interpret the risk scores associated with the drivers, and/or the like.

As indicated above, FIGS. 1A-1K are provided as an example. Other examples may differ from what is described with regard to FIGS. 1A-1K. The number and arrangement of devices shown in FIGS. 1A-1K are provided as an example. In practice, there may be additional devices, fewer devices, different devices, or differently arranged devices than those shown in FIGS. 1A-1K. Furthermore, two or more devices shown in FIGS. 1A-1K may be implemented within a single device, or a single device shown in FIGS. 1A-1K may be implemented as multiple, distributed devices. Additionally, or alternatively, a set of devices (e.g., one or more devices) shown in FIGS. 1A-1K may perform one or more functions described as being performed by another set of devices shown in FIGS. 1A-1K.

Figure 2:
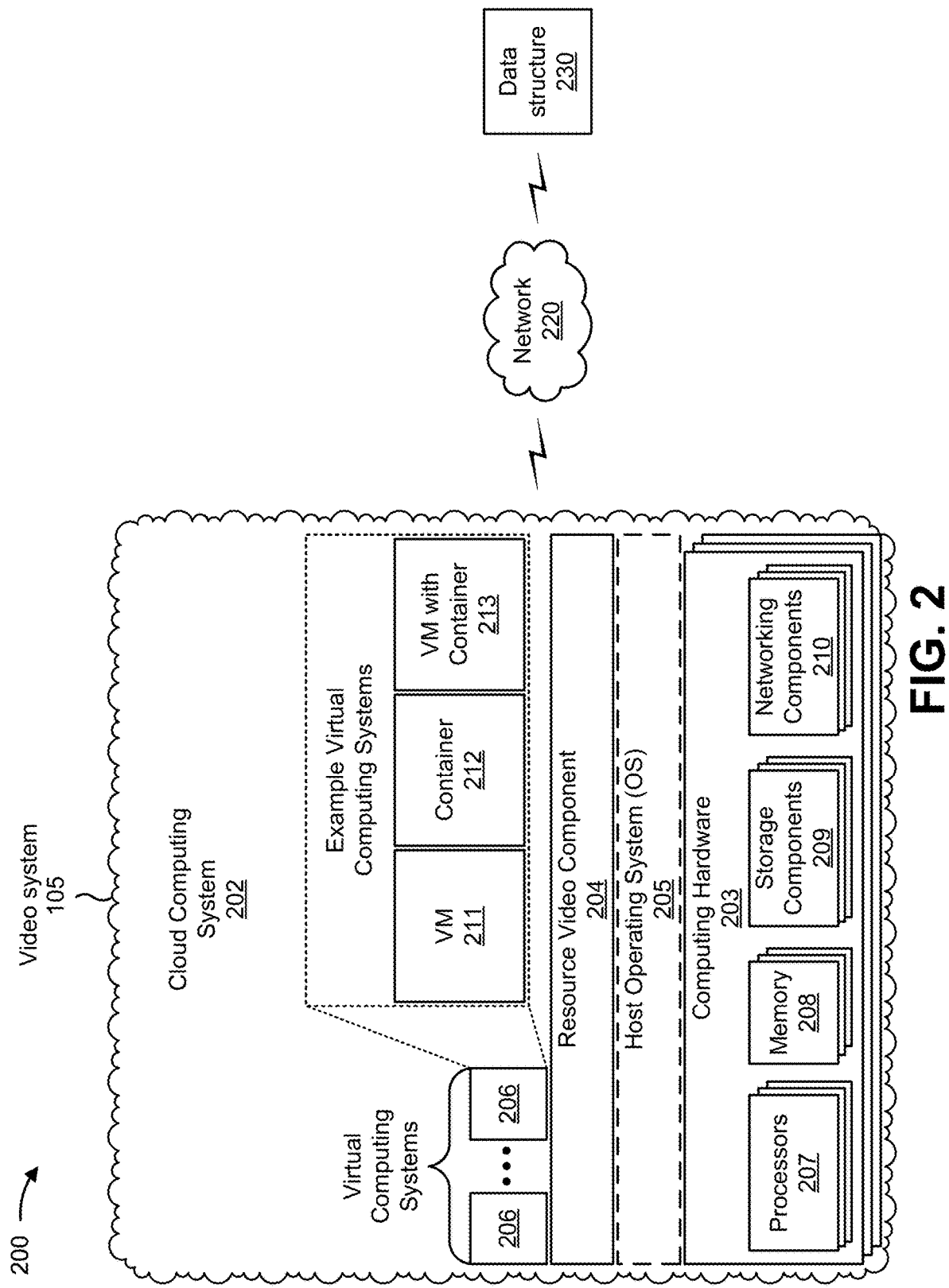
FIG. 2 is a diagram of an example environment in which systems and/or methods described herein may be implemented.

FIG. 2 is a diagram of an example environment 200 in which systems and/or methods described herein may be implemented. As shown in FIG. 2, the environment 200 may include the video system 105, which may include one or more elements of and/or may execute within a cloud computing system 202. The cloud computing system 202 may include one or more elements 203-213, as described in more detail below. As further shown in FIG. 2, the environment 200 may include a network 220 and/or a data structure 230. Devices and/or elements of the environment 200 may interconnect via wired connections and/or wireless connections.

The cloud computing system 202 includes computing hardware 203, a resource management component 204, a host operating system (OS) 205, and/or one or more virtual computing systems 206. The cloud computing system 202 may execute on, for example, an Amazon Web Services platform, a Microsoft Azure platform, or a Snowflake platform. The resource management component 204 may perform virtualization (e.g., abstraction) of the computing hardware 203 to create the one or more virtual computing systems 206. Using virtualization, the resource management component 204 enables a single computing device (e.g., a computer or a server) to operate like multiple computing devices, such as by creating multiple isolated virtual computing systems 206 from the computing hardware 203 of the single computing device. In this way, the computing hardware 203 can operate more efficiently, with lower power consumption, higher reliability, higher availability, higher utilization, greater flexibility, and lower cost than using separate computing devices.

The computing hardware 203 includes hardware and corresponding resources from one or more computing devices. For example, the computing hardware 203 may include hardware from a single computing device (e.g., a single server) or from multiple computing devices (e.g., multiple servers), such as multiple computing devices in one or more data centers. As shown, the computing hardware 203 may include one or more processors 207, one or more memories 208, one or more storage components 209, and/or one or more networking components 210. Examples of a processor, a memory, a storage component, and a networking component (e.g., a communication component) are described elsewhere herein.

The resource management component 204 includes a virtualization application (e.g., executing on hardware, such as the computing hardware 203) capable of virtualizing computing hardware 203 to start, stop, and/or manage one or more virtual computing systems 206. For example, the resource management component 204 may include a hypervisor (e.g., a bare-metal or Type 1 hypervisor, a hosted or Type 2 hypervisor, or another type of hypervisor) or a virtual machine monitor, such as when the virtual computing systems 206 are virtual machines 211. Additionally, or alternatively, the resource management component 204 may include a container manager, such as when the virtual computing systems 206 are containers 212. In some implementations, the resource management component 204 executes within and/or in coordination with a host operating system 205.

A virtual computing system 206 includes a virtual environment that enables cloud-based execution of operations and/or processes described herein using the computing hardware 203. As shown, the virtual computing system 206 may include a virtual machine 211, a container 212, or a hybrid environment 213 that includes a virtual machine and a container, among other examples. The virtual computing system 206 may execute one or more applications using a file system that includes binary files, software libraries, and/or other resources required to execute applications on a guest operating system (e.g., within the virtual computing system 206) or the host operating system 205.

Although the video system 105 may include one or more elements 203-213 of the cloud computing system 202, may execute within the cloud computing system 202, and/or may be hosted within the cloud computing system 202, in some implementations, the video system 105 may not be cloud-based (e.g., may be implemented outside of a cloud computing system) or may be partially cloud-based. For example, the video system 105 may include one or more devices that are not part of the cloud computing system 202, such as a device 300 of FIG. 3, which may include a standalone server or another type of computing device. The video system 105 may perform one or more operations and/or processes described in more detail elsewhere herein.

The network 220 includes one or more wired and/or wireless networks. For example, the network 220 may include a cellular network, a public land mobile network (PLMN), a local area network (LAN), a wide area network (WAN), a private network, the Internet, and/or a combination of these or other types of networks. The network 220 enables communication among the devices of the environment 200.

The data structure 230 may include one or more devices capable of receiving, generating, storing, processing, and/or providing information, as described elsewhere herein. The data structure 230 may include a communication device and/or a computing device. For example, the data structure 230 may include a database, a server, a database server, an application server, a client server, a web server, a host server, a proxy server, a virtual server (e.g., executing on computing hardware), a server in a cloud computing system, a device that includes computing hardware used in a cloud computing environment, or a similar type of device. The data structure 230 may communicate with one or more other devices of environment 200, as described elsewhere herein.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of the environment 200 may perform one or more functions described as being performed by another set of devices of the environment 200.

Figure 3:
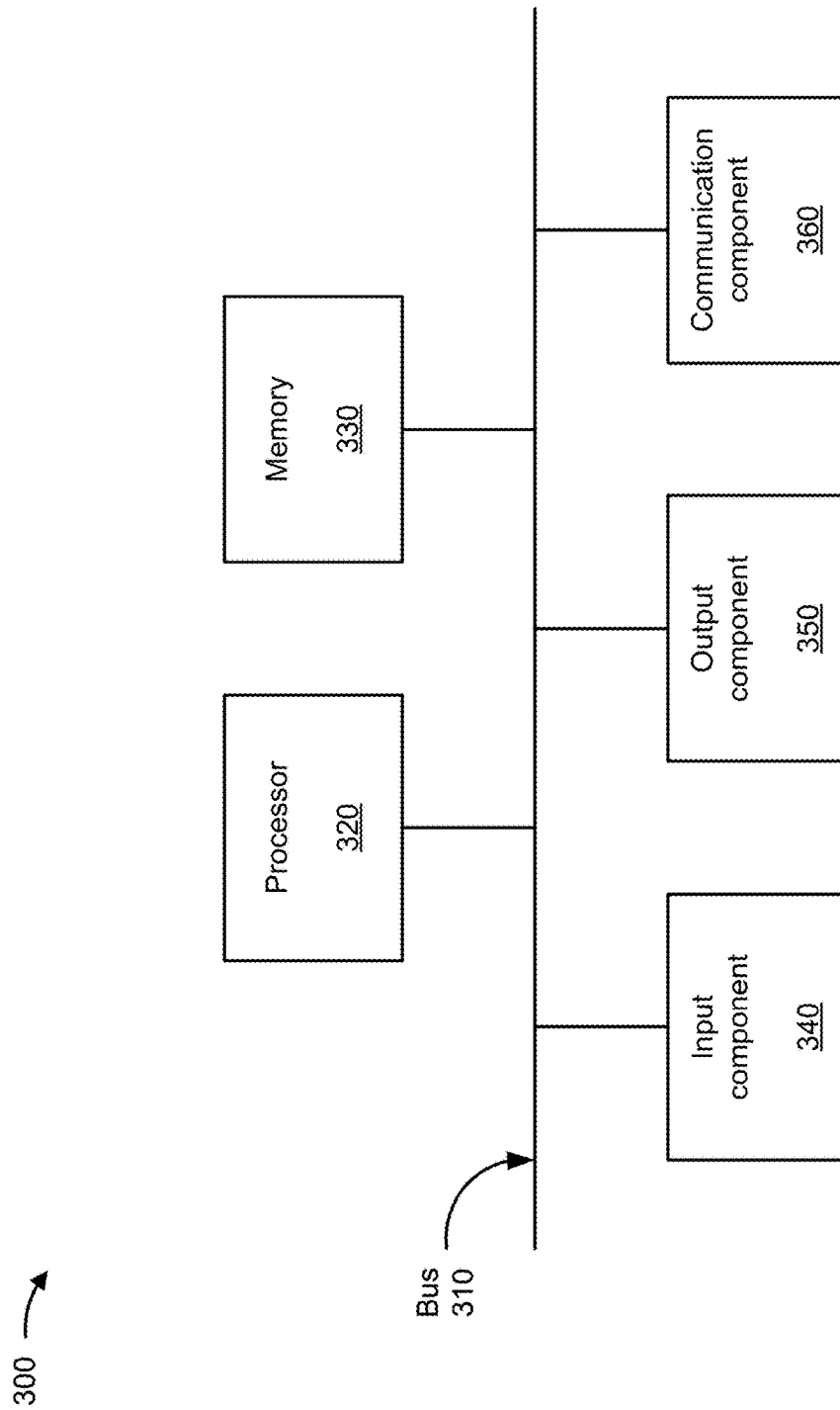
FIG. 3 is a diagram of example components of one or more devices of FIG. 2.

FIG. 3 is a diagram of example components of a device 300, which may correspond to the video system 105 and/or the data structure 230. In some implementations, the video system 105 and/or the data structure 230 may include one or more devices 300 and/or one or more components of the device 300. As shown in FIG. 3, the device 300 may include a bus 310, a processor 320, a memory 330, an input component 340, an output component 350, and a communication component 360.

The bus 310 includes one or more components that enable wired and/or wireless communication among the components of the device 300. The bus 310 may couple together two or more components of FIG. 3, such as via operative coupling, communicative coupling, electronic coupling, and/or electric coupling. The processor 320 includes a central processing unit, a graphics processing unit, a microprocessor, a controller, a microcontroller, a digital signal processor, a field-programmable gate array, an application-specific integrated circuit, and/or another type of processing component. The processor 320 is implemented in hardware, firmware, or a combination of hardware and software. In some implementations, the processor 320 includes one or more processors capable of being programmed to perform one or more operations or processes described elsewhere herein.

The memory 330 includes volatile and/or nonvolatile memory. For example, the memory 330 may include random access memory (RAM), read only memory (ROM), a hard disk drive, and/or another type of memory (e.g., a flash memory, a magnetic memory, and/or an optical memory). The memory 330 may include internal memory (e.g., RAM, ROM, or a hard disk drive) and/or removable memory (e.g., removable via a universal serial bus connection). The memory 330 may be a non-transitory computer-readable medium. The memory 330 stores information, instructions, and/or software (e.g., one or more software applications) related to the operation of the device 300. In some implementations, the memory 330 includes one or more memories that are coupled to one or more processors (e.g., the processor 320), such as via the bus 310.

The input component 340 enables the device 300 to receive input, such as user input and/or sensed input. For example, the input component 340 may include a touch screen, a keyboard, a keypad, a mouse, a button, a microphone, a switch, a sensor, a global positioning system sensor, an accelerometer, a gyroscope, and/or an actuator. The output component 350 enables the device 300 to provide output, such as via a display, a speaker, and/or a light-emitting diode. The communication component 360 enables the device 300 to communicate with other devices via a wired connection and/or a wireless connection. For example, the communication component 360 may include a receiver, a transmitter, a transceiver, a modem, a network interface card, and/or an antenna.

The device 300 may perform one or more operations or processes described herein. For example, a non-transitory computer-readable medium (e.g., the memory 330) may store a set of instructions (e.g., one or more instructions or code) for execution by the processor 320. The processor 320 may execute the set of instructions to perform one or more operations or processes described herein. In some implementations, execution of the set of instructions, by one or more processors 320, causes the one or more processors 320 and/or the device 300 to perform one or more operations or processes described herein. In some implementations, hardwired circuitry may be used instead of or in combination with the instructions to perform one or more operations or processes described herein. Additionally, or alternatively, the processor 320 may be configured to perform one or more operations or processes described herein. Thus, implementations described herein are not limited to any specific combination of hardware circuitry and software.

The number and arrangement of components shown in FIG. 3 are provided as an example. The device 300 may include additional components, fewer components, different components, or differently arranged components than those shown in FIG. 3. Additionally, or alternatively, a set of components (e.g., one or more components) of the device 300 may perform one or more functions described as being performed by another set of components of the device 300.

FIG. 4 depicts a flowchart of an example process 400 for determining video similarity, risk scores, and textual descriptions. In some implementations, one or more process blocks of FIG. 4 may be performed by a device (e.g., the video system 105). In some implementations, one or more process blocks of FIG. 4 may be performed by another device or a group of devices separate from or including the device. Additionally, or alternatively, one or more process blocks of FIG. 4 may be performed by one or more components of the device 300, such as the processor 320, the memory 330, the input component 340, the output component 350, and/or the communication component 360.

As shown in FIG. 4, process 400 may include receiving video data identifying videos associated with one or more unsafe driving events by a driver of a vehicle (block 410). For example, the device may receive video data identifying videos associated with one or more unsafe driving events by a driver of a vehicle, as described above.

As further shown in FIG. 4, process 400 may include determining classifications for the videos based on the video data (block 420). For example, the device may determine classifications for the videos based on the video data, as described above.

As further shown in FIG. 4, process 400 may include assigning tags to the videos based on the classifications (block 430). For example, the device may assign tags to the videos based on the classifications, as described above.

As further shown in FIG. 4, process 400 may include calculating event severity scores based on the classifications (block 440). For example, the device may calculate event severity scores based on the classifications, as described above. In some implementations, calculating the event severity scores based on the classifications includes assigning first weights to first event severity probabilities to generate first weighted probabilities; assigning second weights to second event severity probabilities to generate second weighted probabilities; assigning third weights to third event severity probabilities to generate third weighted probabilities; assigning fourth weights to fourth event severity probabilities to generate fourth weighted probabilities; and combining the first weighted probabilities, the second weighted probabilities, the third weighted probabilities, and the fourth weighted probabilities to generate the event severity scores.

As further shown in FIG. 4, process 400 may include calculating tag scores based on the tags assigned to the videos (block 450). For example, the device may calculate tag scores based on the tags assigned to the videos, as described above. In some implementations, calculating the tag scores based on the tags includes assigning first weights to first tags to generate first weighted tags, assigning second weights to second tags to generate second weighted tags, assigning third weights to third tags to generate third weighted tags, and combining the first weighted tags, the second weighted tags, and the third weighted tags to generate the tag scores.

As further shown in FIG. 4, process 400 may include calculating time-to-contact scores, box cross scores, day/night scores, weather scores, and road condition scores based on the video data (block 460). For example, the device may calculate time-to-contact scores, box cross scores, day/night scores, weather scores, and road condition scores based on the video data, as described above. In some implementations, calculating the time-to-contact scores includes calculating averages of time-to-contact data provided in the video data, and calculating exponentials of the averages to generate the time-to-contact scores. In some implementations, calculating the box cross scores includes calculating averages of box distance data provided in the video data, and calculating exponentials of the averages to generate the box cross scores. In some implementations, calculating the day/night scores includes calculating day/night pixel scores based on means of pixel colors provided in the video data, and calculating the day/night scores based on the day/night pixel scores and times of day provided in the video data.

In some implementations, calculating the weather scores includes assigning first weights to first types of weather data provided in the video data to generate first weighted scores, assigning second weights to second types of weather data provided in the video data to generate second weighted scores, assigning third weights to third types of weather data provided in the video data to generate third weighted scores, and combining the first weighted scores, the second weighted scores, and the third weighted scores to generate the weather scores. In some implementations, calculating the road condition scores includes assigning first weights to first road condition data provided in the video data to generate first weighted scores, assigning second weights to second road condition data provided in the video data to generate second weighted scores, assigning third weights to third road condition data provided in the video data to generate third weighted scores, and combining the first weighted scores, the second weighted scores, and the third weighted scores to generate the road condition scores.

As further shown in FIG. 4, process 400 may include calculating video risk scores for the videos based on the event severity scores, the tag scores, the time-to-contact scores, the box cross scores, the day/night scores, the weather scores, and the road condition scores (block 470). For example, the device may calculate video risk scores for the videos based on the event severity scores, the tag scores, the time-to-contact scores, the box cross scores, the day/night scores, the weather scores, and the road condition scores, as described above.

As further shown in FIG. 4, process 400 may include providing, for display, textual explanations associated with one or more of the video risk scores (block 480). For example, the device may provide, for display, textual explanations associated with one or more of the video risk scores, as described above.

In some implementations, process 400 includes sorting the videos by importance, based on the video risk scores, to generate a sorted list of videos, and providing the sorted list of videos for display. In some implementations, process 400 includes defining, based on the video data, video vectors that represent characteristics of the videos; identifying similar videos in the video data based on the video vectors; and providing, for display, information identifying the similar videos. In some implementations, process 400 includes calculating a driver risk score based on an aggregation of the video risk scores over a time period, and providing the driver risk score for display.

In some implementations, process 400 includes comparing inputs and the video risk scores with respective thresholds to determine sentiments associated with the videos; determining first textual descriptions for video risk scores associated with negative sentiments; determining second textual descriptions for inputs associated with negative sentiments and third textual descriptions for inputs associated with positive sentiments based on the video risk scores associated with the negative sentiments; and providing, for display, the video risk scores associated with the negative sentiments, the first textual descriptions, the second textual descriptions, and the third textual descriptions.

In some implementations, process 400 includes comparing inputs and the video risk scores with respective thresholds to determine sentiments associated with the videos; determining first textual descriptions for video risk scores associated with positive sentiments; determining second textual descriptions for inputs associated with positive sentiments and third textual descriptions for inputs associated with negative sentiments based on the video risk scores associated with the positive sentiments; and providing, for display, the video risk scores associated with the positive sentiments, the first textual descriptions, the second textual descriptions, and the third textual descriptions.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

To the extent the aforementioned implementations collect, store, or employ personal information of individuals, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

In the preceding specification, various example embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method, comprising:
  receiving, by a device, video data identifying videos associated with one or more unsafe driving events by a driver of a vehicle;
  determining, by the device, classifications for the videos based on event severity probabilities;
  assigning, by the device, tags to the videos based on the classifications;
  calculating, by the device, event severity scores based on the classifications and based on assigning one or more weights to the event severity probabilities;
  calculating, by the device, tag scores, time-to-contact scores, box cross scores, day/night scores, weather scores, and road condition scores based on the video data, wherein calculating the tag scores is based on:
    assigning one or more weights to the tags assigned to the videos to generate weighted tags, and
    combining the weighted tags;
  calculating, by the device, video risk scores for the videos based on the event severity scores, the tag scores, the time-to-contact scores, the box cross scores, the day/night scores, the weather scores, and the road condition scores; and
  providing, by the device and for display, textual explanations associated with one or more of the video risk scores.

2. The method of claim 1, further comprising:
  sorting the videos by importance, based on the video risk scores, to generate a sorted list of videos; and
  providing the sorted list of videos for display.

3. The method of claim 1, further comprising:
  defining, based on the video data, video vectors that represent characteristics of the videos;
  identifying similar videos in the video data based on the video vectors; and
  providing, for display, information identifying the similar videos.

4. The method of claim 1, further comprising:
  calculating a driver risk score based on an aggregation of the video risk scores over a time period; and
  providing the driver risk score for display.

5. The method of claim 1, further comprising:
  comparing inputs and the video risk scores with respective thresholds to determine sentiments associated with the videos;
  determining first textual descriptions for video risk scores associated with negative sentiments;
  determining second textual descriptions for inputs associated with negative sentiments and third textual descriptions for inputs associated with positive sentiments based on the video risk scores associated with the negative sentiments; and
  providing, for display, the video risk scores associated with the negative sentiments, the first textual descriptions, the second textual descriptions, and the third textual descriptions.

6. The method of claim 1, further comprising:
  comparing inputs and the video risk scores with respective thresholds to determine sentiments associated with the videos;
  determining first textual descriptions for video risk scores associated with positive sentiments;
  determining second textual descriptions for inputs associated with positive sentiments and third textual descriptions for inputs associated with negative sentiments based on the video risk scores associated with the positive sentiments; and
  providing, for display, the video risk scores associated with the positive sentiments, the first textual descriptions, the second textual descriptions, and the third textual descriptions.

7. The method of claim 1, wherein calculating the event severity scores based on the classifications and based on assigning the one or more weights to the event severity probabilities comprises:

assigning first weights to first event severity probabilities to generate first weighted probabilities;
assigning second weights to second event severity probabilities to generate second weighted probabilities;
assigning third weights to third event severity probabilities to generate third weighted probabilities;
assigning fourth weights to fourth event severity probabilities to generate fourth weighted probabilities; and
combining the first weighted probabilities, the second weighted probabilities, the third weighted probabilities, and the fourth weighted probabilities to generate the event severity scores.

8. A device, comprising:
one or more processors configured to:
receive video data identifying videos associated with one or more unsafe driving events by a driver of a vehicle;
process the video data, with a machine learning model, to determine classifications for the videos based on event severity probabilities;
assign tags to the videos based on the classifications;
calculate event severity scores based on the classifications and based on assigning one or more weights to the event severity probabilities;
calculate tag scores based on the tags assigned to the videos;
calculate time-to-contact scores, box cross scores, day/night scores, weather scores, and road condition scores based on the video data;
calculate video risk scores for the videos based on the event severity scores, the tag scores, the time-to-contact scores, the box cross scores, the day/night scores, the weather scores, and the road condition scores;
sort the videos by importance, based on the video risk scores, to generate a sorted list of videos; and
provide the sorted list of videos for display.

9. The device of claim 8, wherein the one or more processors, to calculate the tag scores based on the tags, are configured to:
assign first weights to first tags to generate first weighted tags;
assign second weights to second tags to generate second weighted tags;
assign third weights to third tags to generate third weighted tags; and
combine the first weighted tags, the second weighted tags, and the third weighted tags to generate the tag scores.

10. The device of claim 8, wherein the one or more processors, to calculate the time-to-contact scores, are configured to:
calculate averages of time-to-contact data provided in the video data; and
calculate exponentials of the averages to generate the time-to-contact scores.

11. The device of claim 8, wherein the one or more processors, to calculate the box cross scores, are configured to:
calculate averages of box distance data provided in the video data; and
calculate exponentials of the averages to generate the box cross scores.

12. The device of claim 8, wherein the one or more processors, to calculate the day/night scores, are configured to:
calculate day/night pixel scores based on means of pixel colors provided in the video data; and
calculate the day/night scores based on the day/night pixel scores and times of day provided in the video data.

13. The device of claim 8, wherein the one or more processors, to calculate the weather scores, are configured to:
assign first weights to first types of weather data provided in the video data to generate first weighted scores;
assign second weights to second types of weather data provided in the video data to generate second weighted scores;
assign third weights to third types of weather data provided in the video data to generate third weighted scores; and
combine the first weighted scores, the second weighted scores, and the third weighted scores to generate the weather scores.

14. The device of claim 8, wherein the one or more processors, to calculate the road condition scores, are configured to:
assign first weights to first road condition data provided in the video data to generate first weighted scores;
assign second weights to second road condition data provided in the video data to generate second weighted scores;
assign third weights to third road condition data provided in the video data to generate third weighted scores; and
combine the first weighted scores, the second weighted scores, and the third weighted scores to generate the road condition scores.

15. A non-transitory computer-readable medium storing a set of instructions, the set of instructions comprising:
one or more instructions that, when executed by one or more processors of a device, cause the device to:
receive video data identifying videos associated with one or more unsafe driving events by a driver of a vehicle;
process the video data, with a machine learning model, to determine classifications for the videos based on event severity probabilities;
assign tags to the videos based on the classifications;
calculate event severity scores based on the classifications and based on assigning one or more weights to the event severity probabilities;
calculate tag scores based on assigning one or more weights to the tags assigned to the videos;
calculate time-to-contact scores, box cross scores, day/night scores, weather scores, and road condition scores based on the video data;
calculate video risk scores for the videos based on the event severity scores, the tag scores, the time-to-contact scores, the box cross scores, the day/night scores, the weather scores, and the road condition scores;
provide one or more of the video risk scores for display;
define, based on the video data, video vectors that represent characteristics of the videos;
identify similar videos in the video data based on the video vectors; and
provide, for display, information identifying the similar videos.

16. The non-transitory computer-readable medium of claim 15, wherein the one or more instructions further cause the device to:
sort the videos by importance, based on the video risk scores, to generate a sorted list of videos; and
provide the sorted list of videos for display.

17. The non-transitory computer-readable medium of claim 15, wherein the one or more instructions further cause the device to:
- calculate a driver risk score based on an aggregation of the video risk scores over a time period; and
- provide the driver risk score for display.

18. The non-transitory computer-readable medium of claim 15, wherein the one or more instructions further cause the device to:
- compare inputs and the video risk scores with respective thresholds to determine sentiments associated with the videos;
- determine first textual descriptions for video risk scores associated with negative sentiments;
- determine second textual descriptions for inputs associated with negative sentiments and third textual descriptions for inputs associated with positive sentiments based on the video risk scores associated with the negative sentiments; and
- provide, for display, the video risk scores associated with the negative sentiments, the first textual descriptions, the second textual descriptions, and the third textual descriptions.

19. The non-transitory computer-readable medium of claim 15, wherein the one or more instructions further cause the device to:
- compare inputs and the video risk scores with respective thresholds to determine sentiments associated with the videos;
- determine first textual descriptions for video risk scores associated with positive sentiments;
- determine second textual descriptions for inputs associated with positive sentiments and third textual descriptions for inputs associated with negative sentiments based on the video risk scores associated with the positive sentiments; and
- provide, for display, the video risk scores associated with the positive sentiments, the first textual descriptions, the second textual descriptions, and the third textual descriptions.

20. The non-transitory computer-readable medium of claim 15, wherein the one or more instructions, that cause the device to calculate the event severity scores based on the classifications and based on assigning the one or more weights to the event severity probabilities, cause the device to:
- assign first weights to first event severity probabilities to generate first weighted probabilities;
- assign second weights to second event severity probabilities to generate second weighted probabilities;
- assign third weights to third event severity probabilities to generate third weighted probabilities;
- assign fourth weights to fourth event severity probabilities to generate fourth weighted probabilities; and
- combine the first weighted probabilities, the second weighted probabilities, the third weighted probabilities, and the fourth weighted probabilities to generate the event severity scores.

* * * * *